United States Patent
Tokumoto et al.

(10) Patent No.: US 6,973,991 B2
(45) Date of Patent: Dec. 13, 2005

(54) ELECTRIC POWER STEERING APPARATUS

(75) Inventors: Yoshitomo Tokumoto, Mie (JP);
Mahito Shiba, Osaka (JP); Kenichi Kotaka, Osaka (JP); Naoki Maeda, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 17 days.

(21) Appl. No.: 10/445,353

(22) Filed: May 27, 2003

(65) Prior Publication Data

US 2004/0007419 A1    Jan. 15, 2004

(30) Foreign Application Priority Data

May 27, 2002 (JP) .................. P. 2002-152530

(51) Int. Cl.⁷ .............................................. B62D 5/04
(52) U.S. Cl. ................ 180/446; 180/443; 180/444; 73/862.334; 73/862.328; 73/862.329
(58) Field of Search ................................. 180/443–446

(56) References Cited

U.S. PATENT DOCUMENTS

| | | | | |
|---|---|---|---|---|
| 3,060,360 A | * | 10/1962 | Tomek | 318/676 |
| 4,580,648 A | * | 4/1986 | Murakami et al. | 180/446 |
| 4,715,461 A | * | 12/1987 | Shimizu | 180/446 |
| 4,756,376 A | * | 7/1988 | Shimizu | 180/444 |
| 4,874,053 A | * | 10/1989 | Kimura et al. | 180/443 |
| 4,946,001 A | | 8/1990 | Taniguchi et al. | |
| 5,198,981 A | * | 3/1993 | Collier-Hallman et al. | 701/42 |
| 5,239,490 A | * | 8/1993 | Masaki et al. | 702/41 |
| 5,467,279 A | * | 11/1995 | Wada et al. | 701/42 |
| 5,612,877 A | * | 3/1997 | Shimizu et al. | 701/41 |
| 5,631,529 A | * | 5/1997 | Shimizu et al. | 318/432 |
| 5,709,281 A | * | 1/1998 | Sherwin et al. | 180/272 |
| 5,845,222 A | | 12/1998 | Yamamoto et al. | |
| 5,904,223 A | | 5/1999 | Shimizu et al. | |
| 6,295,879 B1 | * | 10/2001 | Miller et al. | 73/862.08 |
| 6,363,797 B1 | * | 4/2002 | Tokumoto | 73/862.328 |
| 6,543,571 B2 | * | 4/2003 | Tokumoto | 180/446 |
| 2002/0005316 A1 | | 1/2002 | Tokumoto | |

FOREIGN PATENT DOCUMENTS

| | | | |
|---|---|---|---|
| EP | 0 760 325 A2 | 3/1997 | |
| EP | 1 174 328 A1 | 1/2002 | |
| EP | 1 321 349 A2 | 6/2003 | |
| EP | 1369339 A2 * | 12/2003 | B62D 5/04 |
| FR | 2 811 628 A1 | 1/2002 | |
| JP | 2002-29431 | 1/2002 | |

* cited by examiner

Primary Examiner—Lesley D. Morris
Assistant Examiner—Paul Royal, Jr.
(74) Attorney, Agent, or Firm—McGinn IP Law Group, PLLC

(57) ABSTRACT

A driving control unit (21b) of a controller (21) determines which of an input shaft (32) and an output shaft (33) in a steering shaft (3) is dynamically superior and when the output shaft (33) is dynamically superior to the input shaft (32), a motor (6) is driven so that torque resulting in a time integral value smaller than a time integral value of relative torque between the input shaft (32) and the output shaft (33) is generated in a backward assist direction.

16 Claims, 4 Drawing Sheets

ELECTRIC POWER STEERING APPARATUS

BACKGROUND OF THE INVENTION

The present invention relates to a power steering apparatus.

In a related electric power steering apparatus described in, for example, JP-A-2002-29431, torque T is calculated from a relative difference between steering angles in an input shaft of the input side and an output shaft of the output side from a torsion bar in a steering shaft. Then, when it is determined that the torque T is backward input torque based on each angular speed and vehicle speed of the input shaft and the output shaft, a sign (+, −) of the torque T is reversed and the torque T is set to backward assist torque, and a motor for steering assistance is driven in order to generate it. Incidentally, the case that the torque T becomes the backward input torque is, for example, the case that disturbance from a road surface is received in a steering direction of wheels in a steering holding state at the time of straight travel.

Thus, the backward input torque due to the disturbance is offset by driving force of the motor to prevent the disturbance from propagating to a handle.

However, in the related electric power steering apparatus as described above, unnatural steering feeling may be given to a driver by performing a backward assist operation in which the disturbance is offset regardless of driver's intention. Since the disturbance hardly propagates to the handle, it is difficult for the driver to accurately grasp a state of the road surface. Giving an extreme example, there is little difference between the case of running a snowy road with low frictional resistance of the road surface in a steering direction and the case of running a gravel road with high frictional resistance in the disturbance propagating to the driver through the handle. That is, information about the road surface through the handle does not propagate to the driver accurately.

SUMMARY OF THE INVENTION

In view of the problem as described above, an object of the invention is to provide an electric power steering apparatus for propagating disturbance to a handle moderately while suppressing the disturbance.

In order to solve the aforesaid object, the invention is characterized by having the following arrangement.

(1) An electric power steering apparatus for applying rotation force of a motor to a steering system including a steering member and steering wheels for performing a steering assist, the power steering apparatus comprising:
   an input shaft coupled to the steering member;
   an output shaft;
   a torsion bar coupling the input shaft to the output shaft;
   an input shaft rotation detection unit for outputting a signal in response to rotation of the input shaft;
   an output shaft rotation detection unit for outputting a signal in response to rotation of the output shaft;
   a computation unit for obtaining information concerning torque transmitted between the input and output shafts and angular displacement with respect to each of the input and output shafts on the basis of outputs of the input shaft rotation detection unit and the output shaft rotation detection unit; and
   a driving control unit for generating steering assist force by driving the motor in response to the torque transmitted between the input and output shafts, wherein the driving control unit determines which of the input shaft and the output shaft is dynamically superior based on the obtained information and when the output shaft is dynamically superior to the input shaft, the driving control unit controls the motor so that torque smaller than the torque transmitted between the input and output shafts is generated in a backward assist direction.

(2) The electric power steering apparatus according to (1), wherein when the output shaft is dynamically superior to the input shaft, the driving control unit controls the motor so that torque resulting in a time integral value smaller than a time integral value of the torque transmitted between the input and output shafts is generated in a backward assist direction.

(3) The electric power steering apparatus according to (1), wherein the information obtained by the computation unit includes angular speed and angular acceleration, and the determination made by the driving control unit is made based on either of the angular speed and the angular acceleration.

(4) The electric power steering apparatus according to (1), wherein a waveform of torque generated in the backward assist direction is a damped oscillatory waveform.

(5) An electric power steering apparatus for a steering system including a steering member and steering wheels comprising:
   an input shaft coupled to the steering member;
   an output shaft;
   a torsion bar coupling the input shaft to the output shaft;
   a first target plate made of magnetic material fixed to the input shaft, the first target plate having spur gear shape having a first predetermined number of teeth;
   a second target plate made of magnetic material fixed to the output shaft, the second target plate having spur gear shape having the first predetermined number of teeth;
   a third target plate made of magnetic material fixed to the output shaft, the third target plate having spur gear shape having a second predetermined number of teeth, in which the first predetermined number and the second predetermined number are mutually prime;
   a first pair of magnetic sensors opposed to the first target plate;
   a second pair of magnetic sensors opposed to the second target plate;
   a third pair of magnetic sensors opposed to the third target plate; and
   a computation unit for obtaining an absolute rotation position and a rotating direction of the output shaft based on outputs from the first, second and third magnetic sensors.

DETAILED DESCRIPTION OF PREFERRED EMBODIMENTS

Figure 1:
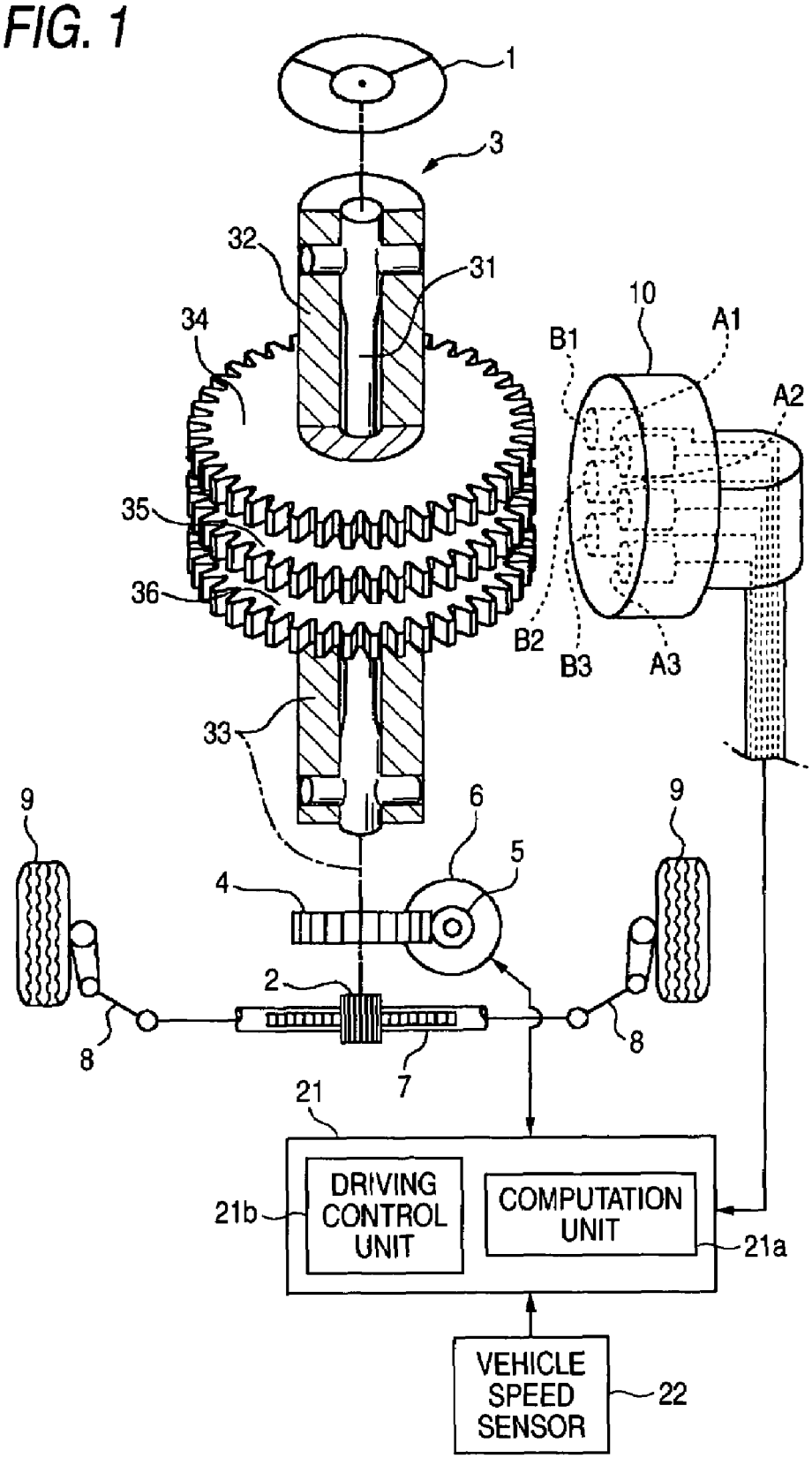
FIG. 1 is a diagram schematically showing a structure of an electric power steering apparatus according to one embodiment of the invention.

FIG. 1 is a diagram schematically showing a structure of an electric power steering apparatus according to an embodiment of the invention. The apparatus is an apparatus which is mounted in, for example, an automobile, and in which a steering shaft 3 is disposed between a steering member (handle) 1 and a pinion 2. The steering shaft 3 includes a torsion bar 31 provided in the center, an input shaft 32 fixed in the input side (upper) of the torsion bar 31, an output shaft 33 fixed in the output side (lower) of the torsion bar 31, a first target plate 34 fitted outside the input shaft 32, and a second target plate 35 and a third target plate 36 fixed in the output shaft 33. The input shaft 32 and the output shaft 33 are coaxially placed each other but are not directly connected each other and are connected through the torsion bar 31. The first target plate 34, the second target plate 35 and the third target plate 36 are coaxially placed one another.

Each of the target plates 34 to 36 described above has a form of spur gear shape, and outer circumferential teeth made of magnetic material form an uneven target at regular intervals circumferentially. The number of teeth of the first target plate 34 is the same number N (for example, 36) as that of teeth of the second target plate 35, and the number of teeth of the third target plate 36 is the number (for example, 35) which is mutually prime (without having common divisors other than 1) to N.

Incidentally, each of the target plates 34 to 36 described above is separate from the input shaft 32 or the output shaft 33 and has a structure fitted in the outside, but the input shaft 32 or the output shaft 33 may be made of magnetic material and may be formed integrally to the corresponding target plates 34 to 36.

A worm wheel 4 is attached to the output shaft 33 and this worm wheel meshes with a worm 5 attached to an output shaft of a motor 6. Rotation of the motor 6 is transmitted to the pinion 2 through the worm 5 and the worm wheel 4 and results in steering assistance force. Rotation of the pinion 2 is converted into linear motion of a rack 7 and steering wheels 9 are steered through right and left tie rods 8.

Six magnetic sensors A1, B1, A2, B2, A3, B3 to which the outer circumferential teeth of each of the target plates 34 to 36 described above are opposed are placed in three rows and two columns and these sensors are held in a sensor box 10. The sensor box 10 is fixed in a predetermined position of an automobile body. The sensors A1, B1 opposed to the first target plate 34 are offset from each other in a circumferential direction of the first target plate 34. Similarly, the sensors A2, B2 opposed to the second target plate 35 are offset from each other in the circumferential direction thereof, and the sensors A3 and B3 opposed to the third target plate 36 are offset from each other in the circumferential direction thereof.

For the magnetic sensors A1 to A3, B1 to B3, an element having characteristics in which resistance changes by action of a magnetic field such as a magneto resistive element (MR element) is used. The magnetic sensors A1 to A3, B1 to B3 output a signal voltage periodically changing in response to unevenness of the outer circumference of each of the opposite target plates 34 to 36. Therefore, output from the magnetic sensors A1, B1 corresponds to angular displacement of the input shaft 32 and the first target plate 34, and output from the magnetic sensors A2, B2 corresponds to angular displacement of the output shaft 33 and the second target plate 35. Similarly, output from the magnetic sensors A3, B3 corresponds to angular displacement of the output shaft 33 and the third target plate 36.

The outputs from the magnetic sensors A1 to A3, B1 to B3 are inputted to a controller 21 into which a CPU is built. The controller 21 has functions of a computation unit 21a and a driving control unit 21b, which are achieved by software processing. By the computation unit 21a, angular displacement θ1 of the input shaft 32 and the first target plate 34 is calculated from the output of the magnetic sensors A1, B1. Similarly, angular displacement θ2 of the output shaft 33 and the second target plate 35 is calculated from the output of the magnetic sensors A2, B2. A signal of a vehicle speed detected by a vehicle speed sensor 22 is inputted to the controller 21. The motor 6 is driven and controlled by the controller 21.

Figure 2:
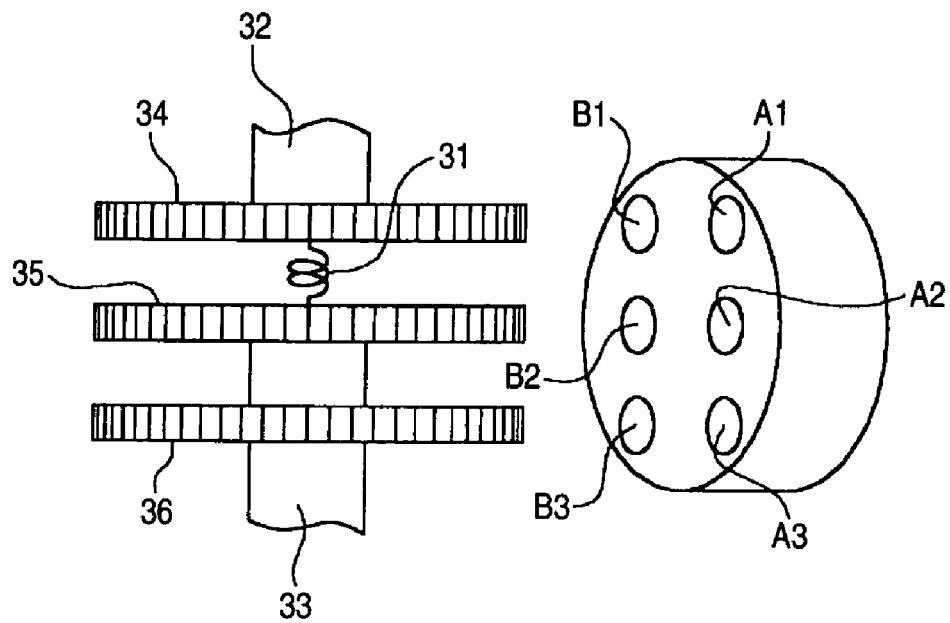
FIG. 2 is a diagram schematically showing a torsion bar, an input shaft, an output shaft, each target plate and magnetic sensors in the electric power steering apparatus.
Figure 3:
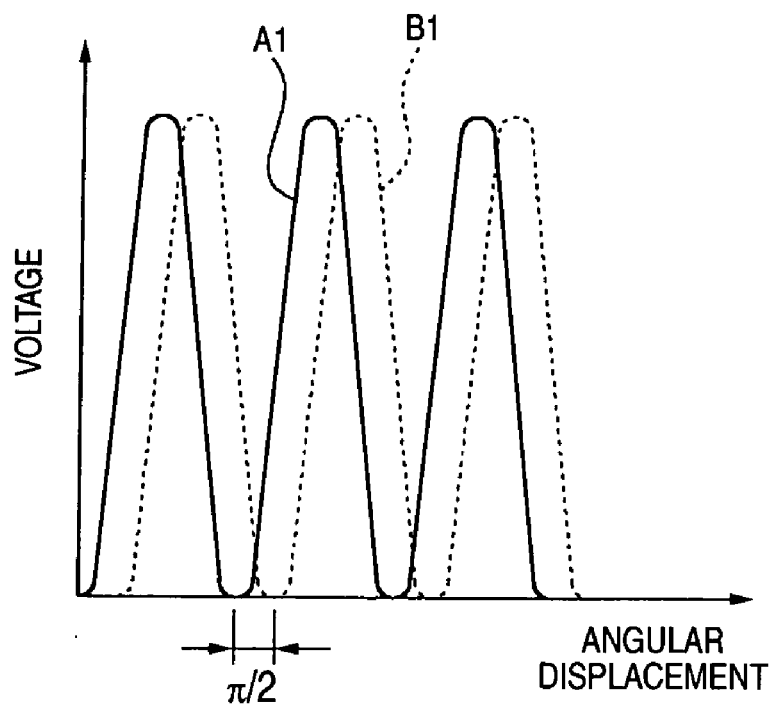
FIG. 3 is a graph showing output signals (voltages) from magnetic sensors in the electric power steering apparatus.

FIG. 2 is a diagram schematically showing the torsion bar 31, the input shaft 32, the output shaft 33, each of the target plates 34 to 36, and the magnetic sensors A1 to A3, B1 to B3. The first target plate 34 rotates with the input shaft 32, and output signals of the magnetic sensors A1, B1 change depending on unevenness of the outer circumference. That is, the first target plate 34 and the magnetic sensors A1, B1 construct an input shaft rotation detection unit for outputting a signal in response to rotation of the input shaft 32. Here, a phase difference between placements of the magnetic sensors A1 and B1 in an electrical angle with respect to opposite unevenness is set so as to be $\pi/2$. Therefore, output signals (voltages) from the magnetic sensors A1, B1 always shift by $\pi/2$ as shown in FIG. 3. The reason why this is done is because the other signal of a linear region can be used when one signal is in a non-linear region by shifting the output signals of the two magnetic sensors A1, B1 by $\pi/2$ since a non-linear change arises in a maximal value and a minimal value of a waveform. Incidentally, it goes without saying that the phase difference is not limited to $\pi/2$.

Similarly, the second target plate 35 rotates with the output shaft 33, and output signals of the magnetic sensors A2, B2 change depending on unevenness of the outer circumference. That is, the second target plate 35 and the magnetic sensors A2, B2 construct an output shaft rotation detection unit for outputting a signal in response to rotation of the output shaft 33. Similarly, a phase difference between placements of the magnetic sensors A2 and B2 in an electrical angle with respect to opposite unevenness is set so as to be $\pi/2$.

On the other hand, the third target plate 36 rotates with the output shaft 33, and output signals of the magnetic sensors A3, B3 change depending on unevenness of the outer circumference. Similarly, positions of the magnetic sensors A3, B3 in a circumferential direction are the same as those of the magnetic sensors A2, B2, respectively. Here, the number (=35) of teeth of the third target plate 36 is smaller than the number (=36) of teeth of the second target plate 35 by one and thereby, the output of the magnetic sensors A3, B3 causes a phase shift of $((2\pi/36)-(2\pi/35))$ per the amount $(2\pi/36)$ of rotation of the output shaft 33 in comparison with the output of the magnetic sensors A2, B2 and returns to the origin at one rotation of the output shaft 33. Therefore, by previously checking a relation between an absolute rotation position of the output shaft 33 and the phase shift and showing the relation in a table, the absolute rotation position of the output shaft 33 can be determined from the phase shift. Such a table is built into the controller 21. Further, a rotating direction of the output shaft 33 can be determined based on this information.

Next, an operation of the electric power steering apparatus constructed as mentioned above will be described.

Figure 4:
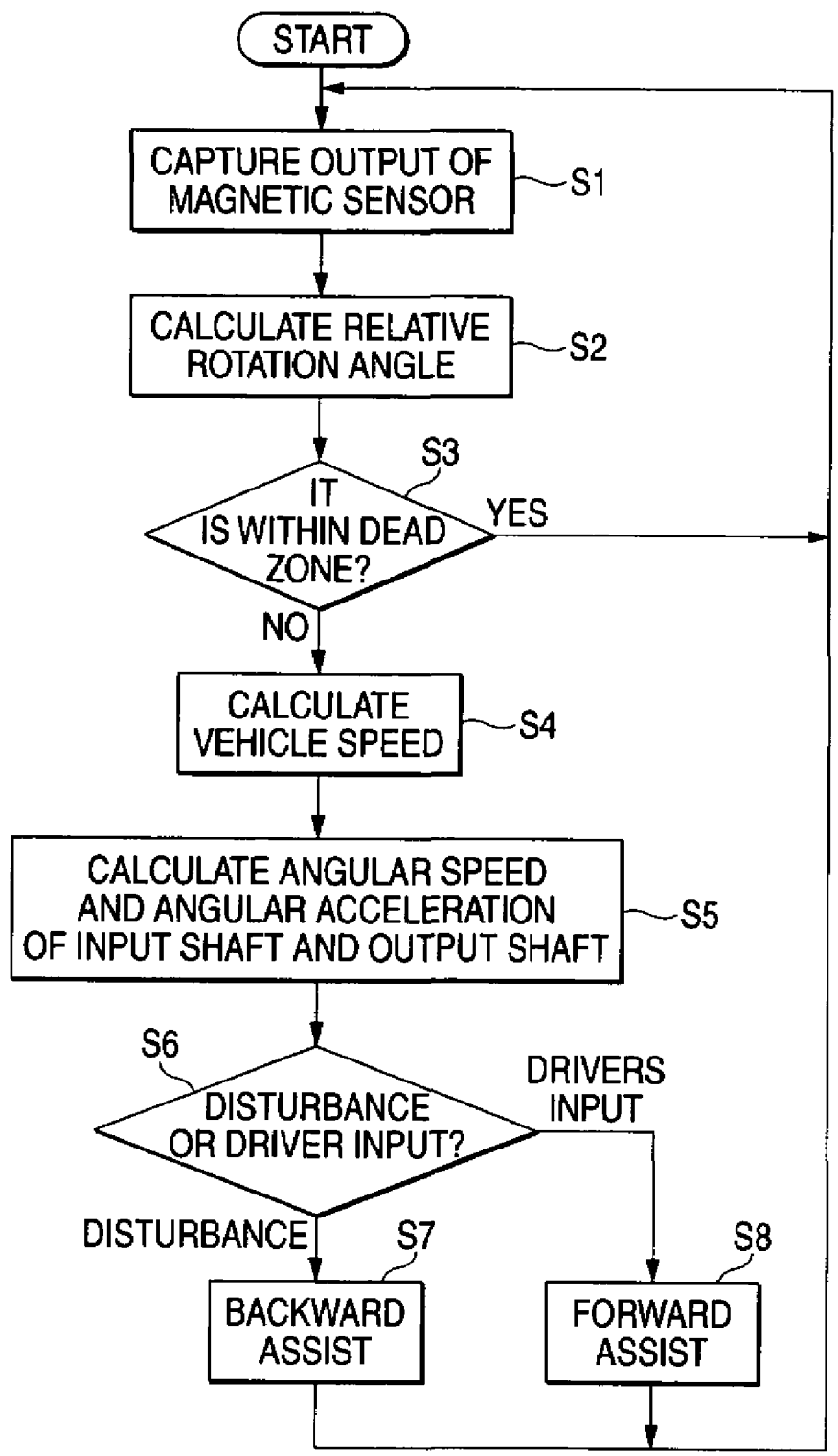
FIG. 4 is a flowchart of an operation performed in a controller in the electric power steering apparatus.

FIG. 4 is one example of a flowchart of an operation performed in the controller 21. Mainly, steps S1 to S5 are an operation acting as the computation means 21a and steps S6 to S8 are operation acting as the driving control unit 21b.

First, by ON manipulation of a key switch (not shown), a power source is supplied to the controller 21 and processing of the flowchart of FIG. 4 is started. In step S1, the controller 21 captures each output of the magnetic sensors A1 to A3, B1 to B3 at a predetermined sampling period and obtains the above-mentioned angular displacements θ1, θ2 based on this and thereafter in step 2, a relative rotation angle between the input shaft 32 and the output shaft 33, that is, an absolute value of (θ1−θ2) is calculated. This value is a torsion angle of the torsion bar 31 and corresponds to torque transmitted between the input shaft 32 and the output shaft 33. Then, the controller 21 decides whether or not this value is within the range of a predetermined dead zone (step S3). Here, when it is within the range, the flowchart returns to step S1 and when it is beyond the range, the flowchart proceeds to step S4. Subsequently, the controller 21 calculates a vehicle speed from the output of the vehicle speed sensor 22 (step S4), and respectively differentiates the angular displacements θ1, θ2 with respect to time to calculate angular speeds ω1, ω2, and further differentiates the angular speeds to calculate angular accelerations ω1', ω2' (step S5).

Next, the controller 21 determines which of the input shaft 32 and the output shaft 33 is in a dynamically superior state from information based on the angular displacements with respect to each of the input shaft 32 and the output shaft 33 (step S6) Here, "dynamically superior" means more active. Specifically, the controller determines whether torque applied between the input shaft 32 and the output shaft 33 exceeding the dead zone is torque caused by disturbance propagating from a road surface or torque caused by of driver input, that is, handle manipulation of a driver. This determination is made by comparison of the angular speeds or comparison of the angular accelerations. The angular speed has the same meaning as that of a frequency of the angular displacement, and this is because the more active shaft generally has a higher frequency. The angular acceleration means force applied in a direction of the angular displacement, and this is because the more active shaft generally applies strong force.

That is, the controller 21 determines that it is the disturbance in the case of ω1<ω2 or ω1'<ω2', and an operation of a backward assist is performed (step S7), and in the case of ω1≧ω2 and ω1'≧ω2', it is determined that it is the driver input and an operation of a forward assist is performed (step S8). Thus, by making the angular speed comparison and the angular acceleration comparison and making the logical OR determination, it can accurately be determined which of the input shaft 32 and the output shaft 33 is superior from both aspects of the angular speed (frequency) and the force. Incidentally, the forward assist means that assist force is applied from the motor 6 in a direction of the driver input and in this case, the assist force is applied until the relative rotation angle reaches the range of the dead zone. In the forward assist, a vehicle speed is considered and steering assistance of speed responsive type is performed. On the other hand, the backward assist means that steering assist force is applied from the motor 6 in a direction of reducing torque caused by the disturbance. Incidentally, the case that deterioration of steering feeling due to the disturbance becomes a problem is at the time of high speed travel. Therefore, when the vehicle speed does not reach a constant speed, it may be processed so as to pass up the operation of the backward assist in step S7.

Figure 5:
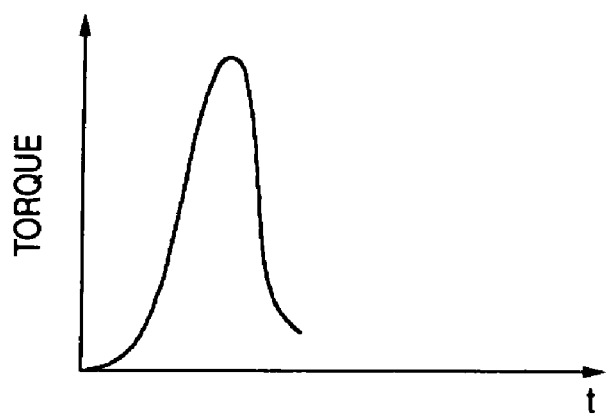
FIG. 5 is a graph showing one example of a torque waveform of disturbance.
Figure 6:
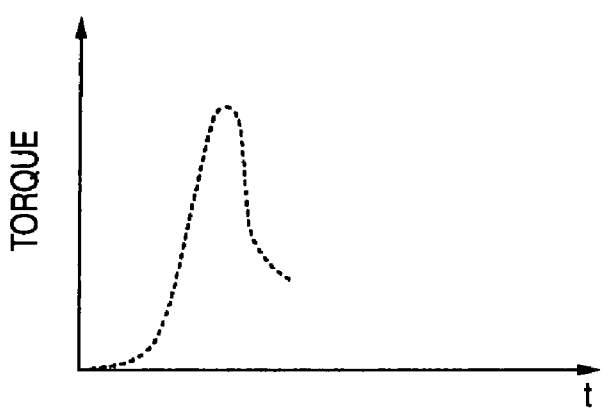
FIG. 6 is a graph showing one example of a torque waveform of a backward assist to disturbance.

FIG. 5 is a graph showing a torque waveform of disturbance suffered in a steering direction of wheels at the time when an automobile passes on an iron plate of a joint of, for example, an express highway, and the axis of abscissa shows time and the axis of ordinate shows torque of disturbance. However, this waveform is a waveform of the case that the backward assist is not considered. With respect to such disturbance, the controller 21 generates backward assist torque as shown in FIG. 6 substantially. Specifically, when the controller 21 determines that it is the disturbance in step S6, in step S7, a time integral value of torque (relative torque between the input shaft 32 and the output shaft 33) to that point in time is calculated based on the relative rotation angle, and the motor 6 is driven so that torque resulting in a time integral value (for example, 80 to 90%) slightly smaller than its value is generated in a backward assist direction. During continuation of the disturbance, in step S7, torque resulting in a time integral value slightly smaller than a time integral value of disturbance torque at that point in time continues to be given sequentially in the backward assist direction and the disturbance is relieved. Then, when the relative rotation angle reaches the range of the dead zone, the backward assist is completed. Incidentally, in the amount (for example, 10 to 20%) other than the torque offset by the backward assist among the disturbance torque, a driver bears this amount by natural holding steering force.

Thus, occurrence of the disturbance is propagated to the driver slightly while canceling most of the disturbance by the backward assist. Therefore, while suppressing strong disturbance resulting in discomfort or fatigue to the driver, the disturbance is propagated to a handle moderately and the driver can grasp information about a road surface.

Incidentally, in the case of giving a backward assist for immediately offsetting disturbance torque as an instantaneous value, the disturbance is resistant to propagation to the handle as well as it becomes unnatural steering feeling conversely. On the contrary, by performing a backward assist based on disturbance torque as an integral value as described above, the disturbance is relieved more naturally and good steering feeling is obtained and also the disturbance is transmitted surely.

Figure 7:
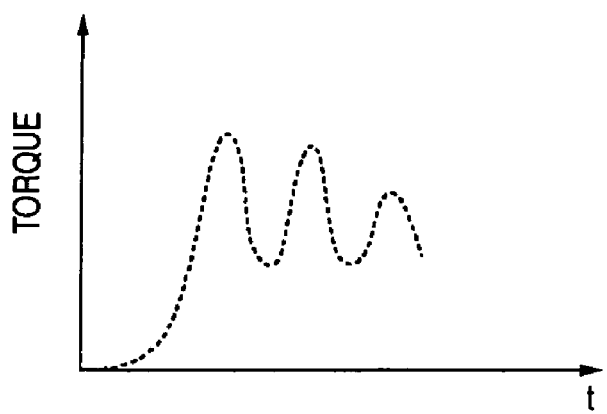
FIG. 7 is a graph showing another example of a torque waveform of a backward assist to disturbance.

FIG. 7 is a graph showing another example of a torque waveform of a backward assist. The torque waveform of this case is damped oscillatory, and can be achieved by reducing backward assist torque in a damped oscillatory manner, for example, initially 90% of a time integral value of torque between the input and output shafts, subsequently with a lapse of time, 50%, 80%, 50%, 70% in the backward assist in step S7. In this case, suppression of the disturbance is slightly weakened but natural convergent feeling of the disturbance is given to the driver. Also, since torque of the disturbance is more propagated to the driver, the driver can surely grasp a state of the road surface.

Incidentally, in the embodiment described above, the target plates 34 to 36 with spur gear shape have been used, but instead of this, a ring-shaped target in which multiple slit-shaped holes are formed at regular intervals circumferentially or a target in which N and S of magnetic poles are alternately placed on an outer circumferential surface may be used.

The invention constructed as described above has the following effect.

According to an electric power steering apparatus, in the case that an output shaft is dynamically superior to an input shaft, that is, in the case of disturbance, by driving the motor so that torque resulting in a time integral value smaller than a time integral value of the torque relatively occurring between the input shaft and the output shaft is generated in a backward assist direction, occurrence of the disturbance can be propagated to a driver slightly while canceling a part of the disturbance by a backward assist. Therefore, while suppressing strong disturbance resulting in discomfort or fatigue to the driver, the disturbance is propagated to a handle moderately and the driver can grasp information about a road surface.

According to an electric power steering apparatus, by making an angular speed comparison and an angular acceleration comparison and making a logical OR determination, it can accurately be determined which of the input shaft and the output shaft is superior from both aspects of the angular speed (frequency) and force. Therefore, it can more surely be determined whether it is disturbance or driver input.

According to an electric power steering apparatus, a torque waveform of the backward assist changes in a damped oscillatory manner and thereby, suppression of the disturbance is slightly weakened but natural convergent feeling of the disturbance is given to the driver. Also, since torque of the disturbance is more propagated to the driver, the driver can surely grasp a state of the road surface.

What is claimed is:

1. An electric power steering apparatus for applying rotation force of a motor to a steering system including a steering member and steering wheels for performing a steering assist, the power steering apparatus comprising:
   an input shaft coupled to the steering member;
   an output shaft;
   a torsion bar coupling the input shaft to the output shaft;
   an input shaft rotation detection unit for outputting a signal in response to rotation of the input shaft;
   an output shaft rotation detection unit for outputting a signal in response to rotation of the output shaft;
   a computation unit for obtaining information concerning torque transmitted between the input and output shafts and angular displacement with respect to each of the input and output shafts on the basis of outputs of the input shaft rotation detection unit and the output shaft rotation detection unit; and
   a driving control unit for generating a steering assist force by driving the motor in response to the torque transmitted between the input and output shafts, wherein the driving control unit determines which of the input shaft and the output shaft is dynamically superior based on the obtained information and when the output shaft is dynamically superior to the input shaft, the driving control unit controls the motor to apply a torque that is smaller than the torque that is transmitted between the input and output shafts in a backward assist direction.

2. The electric power steering apparatus according to claim 1, wherein when the output shaft is dynamically superior to the input shaft, the driving control unit controls the motor so that torque resulting in a time integral value smaller than a time integral value of the torque transmitted between the input and output shafts is generated in a backward assist direction.

3. The electric power steering apparatus according to claim 1, wherein the information obtained by the computation unit includes angular speed and angular acceleration, and the determination made by the driving control unit is made based on either of the angular speed and the angular acceleration.

4. The electric power steering apparatus according to claim 1, wherein a waveform of torque generated in the backward assist direction comprises a damped oscillatory waveform.

5. The apparatus of claim 1, wherein the driving control unit generates a driving control signal for the motor such that the torque from the motor in a backward assist direction has a damped oscillatory waveform.

6. The apparatus of claim 1, wherein the driving control unit generates a driving control signal that controls the motor such that the torque from the steering assist motor in a backward assist direction is smaller than the torque transmitted between the input shaft and the output shaft when the output shaft is dynamically superior to the input shaft.

7. The apparatus of claim 1, wherein the driving control unit further calculates an angular speed signal and an angular acceleration signal for each of the input shaft and the output shaft.

8. The apparatus of claim 7, wherein the driving control unit determines which of the input shaft and the output shaft is dynamically superior further based upon at least one of the angular speed signal and an angular acceleration signal for each of the input shaft and the output shaft.

9. An electric power steering apparatus comprising:
   an input shaft;
   an output shaft;
   a torsion bar coupling the input shaft to the output shaft;
   an input shaft rotation detector that outputs an input shaft rotation signal;
   an output shaft rotation detector that outputs an output shaft rotation signal;
   a processor that calculates angular displacement signals for each of the input shaft and the output shaft and a torque signal that represents the torque between the input shaft and the output shaft based upon the input shaft rotation signal and the output shaft rotation signal; and
   a driving controller that determines which of the input shaft and the output shaft is dynamically superior based on the torque signal and the angular displacement signals, and that controls a steering assist motor so that the steering assist motor applies a torque that is smaller than the torque transmitted between the input shaft and the output shaft in a backward assist direction when the output shaft is dynamically superior to the input shaft.

10. The apparatus of claim 9, wherein the driving controller generates a driving control signal for said a steering assist motor such that the torque from the steering assist motor in a backward assist direction has a time integral value that is smaller than a time integral value of the torque between the input shaft and the output shaft when the output shaft is dynamically superior to the input shaft.

11. The apparatus of claim 9, wherein the processor further calculates an angular speed signal and an angular acceleration signal for each of the input shaft and the output shaft.

12. The apparatus of claim 11, wherein the processor determines which of the input shaft and the output shaft is dynamically superior further based upon at least one of the angular speed signal and an angular acceleration signal for each of the input shaft and the output shaft.

13. The apparatus of claim 9, wherein the driving controller generates a driving control signal for said a steering assist motor such that the torque from a steering assist motor in a backward assist direction has a damped oscillatory waveform.

14. The apparatus of claim 9, wherein the input shaft rotation detector comprises:
   a first target plate fixed to the input shaft and having a spur gear shape with the first predetermined number of teeth; and a first pair of magnetic sensors opposed to the first target plate that outputs a first sensor signal.

15. The apparatus of claim 14, wherein the output shaft rotation detector comprises:

a second target plate fixed to the output shaft and having a spur gear shape with a first predetermined number of teeth;

a third target plate fixed to the output shaft and having a spur gear shape with a second predetermined number of teeth, wherein the first predetermined number and the second predetermined number are mutually prime;

a second pair of magnetic sensors opposed to the second target plate that outputs a second sensor signal; and a third pair of magnetic sensors opposed to the third target plate that outputs a third sensor signal.

16. The apparatus of claim 15, wherein the processor calculates an absolute rotary position and a rotation direction of the output shaft based upon the first sensor signal, the second sensor signal and the third sensor signal.

* * * * *